US011246092B2

United States Patent
Williams

(10) Patent No.: US 11,246,092 B2
(45) Date of Patent: Feb. 8, 2022

(54) LIGHTWEIGHT MESSAGING

(71) Applicant: Tracie Wireless LLC, Burlington, MA (US)

(72) Inventor: Christopher D. Williams, San Diego, CA (US)

(73) Assignee: Tracie Wireless LLC, Burlington, MA (US)

( * ) Notice: Subject to any disclaimer, the term of this patent is extended or adjusted under 35 U.S.C. 154(b) by 49 days.

(21) Appl. No.: 16/798,076

(22) Filed: Feb. 21, 2020

(65) Prior Publication Data

US 2020/0196237 A1 Jun. 18, 2020

Related U.S. Application Data

(63) Continuation of application No. PCT/US2018/048015, filed on Aug. 24, 2018.
(Continued)

(51) Int. Cl.
*H04W 52/02* (2009.01)
*H04L 1/16* (2006.01)

(52) U.S. Cl.
CPC ....... *H04W 52/0216* (2013.01); *H04L 1/1657* (2013.01); *H04W 52/0222* (2013.01); *H04W 52/0254* (2013.01)

(58) Field of Classification Search
CPC ......... H04W 52/0216; H04W 52/0222; H04W 52/0254; H04W 4/029; H04W 4/12;
(Continued)

(56) References Cited

U.S. PATENT DOCUMENTS

| 7,545,256 | B2 | 6/2009 | O'Toole et al. | |
| 2005/0096102 | A1* | 5/2005 | Mock | H04W 52/0235 455/574 |

(Continued)

FOREIGN PATENT DOCUMENTS

WO 2013126747 A2 8/2013

OTHER PUBLICATIONS

International Search Report and Written Opinion issued in International Application No. PCT/US2018/048015 dated Dec. 7, 2018 in 17 pages.

*Primary Examiner* — Rina C Pancholi
(74) *Attorney, Agent, or Firm* — Procopio, Cory, Hargreaves & Savitch LLP

(57) ABSTRACT

Lightweight messaging between a cloud-based platform and compact wireless device. The wireless device may transmit an initial message to a cloud-based platform, and receive an initial response message from the platform that specifies an interval. In response, the wireless device may transmit a reporting message to the platform that identifies the wireless device and indicates a status of the wireless device, set a reporting interval to the specified interval, and, upon expiration of each of a plurality of the reporting interval, transmit a new reporting message to the platform. The reporting interval may be subsequently changed by update messages from the platform. In an embodiment, to reduce resource consumption at the wireless device, the wireless device does not transmit an acknowledgement message to the platform in response to the update messages. Rather, the platform infers acknowledgement based on subsequent actions of the wireless device.

8 Claims, 5 Drawing Sheets

Related U.S. Application Data

(60) Provisional application No. 62/549,818, filed on Aug. 24, 2017.

(58) Field of Classification Search
CPC .... H04W 80/08; H04L 1/1657; H04L 67/125; H04L 67/325; Y02D 30/70; H04B 7/00; G08B 21/18; G08B 21/0219
See application file for complete search history.

(56) References Cited

U.S. PATENT DOCUMENTS

| | | | |
|---|---|---|---|
| 2012/0026992 A1* | 2/2012 | Navda | H04W 52/0203 370/338 |
| 2012/0054304 A1* | 3/2012 | Pica | H04W 24/08 709/217 |
| 2012/0171960 A1* | 7/2012 | Oshinsky | H04W 84/027 455/41.2 |
| 2014/0062695 A1 | 3/2014 | Rosen et al. | |
| 2014/0157370 A1* | 6/2014 | Plattner | G06F 21/6245 726/4 |
| 2016/0026194 A1* | 1/2016 | Mucignat | H04W 4/80 700/278 |
| 2016/0277879 A1 | 9/2016 | Daoura et al. | |
| 2016/0295369 A1 | 10/2016 | Chen | |

\* cited by examiner

LIGHTWEIGHT MESSAGING

CROSS REFERENCE TO RELATED APPLICATION

This application is a Bypass Continuation of International Application No. PCT/US2018/048015 filed on Aug. 24, 2018, which claims the benefit of priority from U.S. Provisional Application No. 62/549,818 filed on Aug. 24, 2017, each of which is incorporated herein in its entirety by reference.

BACKGROUND

Field of the Invention

The embodiments described herein are generally directed to lightweight messaging, and, more particularly, to a lightweight messaging protocol between the cloud and an ultra-tag.

Description of the Related Art

Many wireless applications (e.g., pet tracking) may limit the physical dimensions of the corresponding wireless devices (e.g., wireless pet collar). However, a compact wireless device may be unable to accommodate a large battery. Thus, battery life is a key performance criterion in compact wireless devices.

SUMMARY

Accordingly, systems, methods, and non-transitory computer-readable media are disclosed for a lightweight messaging protocol to be used between a platform (e.g., cloud-based platform) and a compact wireless device (also referred to herein as an "ultra-tag") in order to minimize battery consumption in the compact wireless device.

In an embodiment, a method is disclosed that comprises using at least one hardware processor of a cloud-based platform to: transmit a message to a battery-powered wireless device via a cellular network, wherein the message comprises an instruction to perform a particular action; and, after transmitting the message to the wireless device, monitor a subsequent action of the wireless device, if the subsequent action comprises the particular action, infer that the wireless device correctly received the message, and, if the subsequent action does not comprise the particular action, infer that the wireless device did not correctly receive the message, and automatically retransmit the message to the wireless device via the cellular network.

In an embodiment, a method is disclosed that comprises using at least one hardware processor of a cloud-based platform to: periodically, receive a reporting message from a battery-powered wireless device via a cellular network, wherein the reporting message comprises a remaining battery capacity of the wireless device; determine whether or not the remaining battery capacity is less than a predetermined threshold capacity; and, when the remaining battery capacity is determined to be less than the predetermined threshold capacity, transmit a kill command sequence to the wireless device via the cellular network to instruct the wireless device to shut down. Transmitting the kill command sequence may comprise transmitting a sequence of two or more kill commands. For example, the sequence may consist of three kill commands. After the kill command sequence has been transmitted, if a subsequent reporting message is received from the wireless device, the at least one hardware process may be configured to infer that the kill command sequence was interrupted, and retransmit the kill command sequence to the wireless device via the cellular network.

In an embodiment, a method is disclosed that comprises using at least one hardware processor of a wireless device to: in response to a user input at the wireless device, transmit an initial message to a cloud-based platform via a cellular network; receive an initial response to the initial message from the cloud-based platform, wherein the initial response comprises a reporting interval; and, in response to the initial response, transmit a reporting message to the cloud-based platform via the cellular network, and, upon expiration of each of a plurality of the reporting intervals, transmit a new reporting message to the cloud-based platform via the cellular network, wherein each reporting message identifies the wireless device and indicates a status of the wireless device. The status may comprise one or more of a location, an internal temperature of a battery in the wireless device, and a remaining capacity of the battery in the wireless device. The wireless device may comprise an activation button, and the user input may comprise operation of the activation button. The method may further comprise using the at least one hardware processor of the wireless device to: receive a reporting-frequency-update message from the cloud-based platform via the cellular network, wherein the reporting-frequency-update message comprises a new reporting interval; and, in response to the reporting-frequency-update message, change the reporting interval at which each new reporting message is transmitted to the new reporting interval. The method may further comprise using the at least one hardware processor of the wireless device to: initialize a kill counter; receive a message from the cloud-based platform via the cellular network; determine whether or not the message is a kill command; when the message is determined to not be a kill command, reset the kill counter; and, when the message is determined to be a kill command, increment the kill counter, determine whether or not the kill counter matches a predetermined threshold, and, when the kill counter matches the predetermined threshold, initiate shutdown of the wireless device. The predetermined threshold may be three. The shutdown of the wireless device may be irreversible.

Any of the disclosed methods may be embodied in executable software modules of a processor-based system, such as a server, and/or in executable instructions stored in a non-transitory computer-readable medium. For example, the methods may be embodied in a wireless device comprising a battery, a modem configured to wirelessly communicate with a cellular network, and at least one hardware processor configured to perform the methods (e.g., by executing instructions embodying the methods).

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a lightweight messaging protocol. After reading this description, it will become apparent to one skilled in the art how to implement the invention in various alternative embodiments and alternative applications. Although various embodiments of the present invention will be described herein, it is understood that these embodiments are presented by way of example and illustration only, and not limitation. As such, this detailed description of various embodiments should not be construed to limit the scope or breadth of the present application as set forth in the appended claims.

1. System Overview

1.1. Infrastructure

Figure 1:
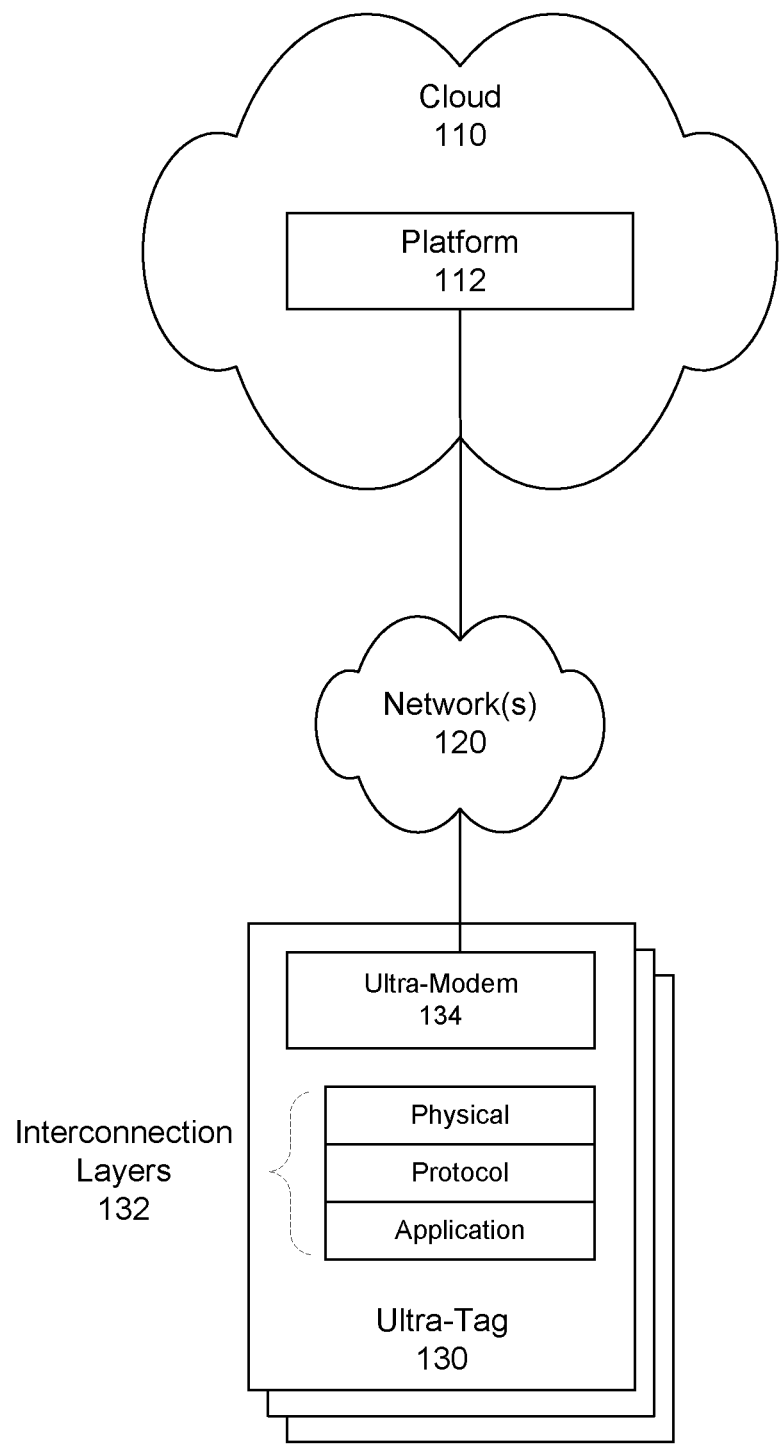
FIG. 1 illustrates an example infrastructure, in which one or more of the processes described herein, may be implemented, according to an embodiment.

FIG. 1 illustrates an example infrastructure in which the disclosed lightweight protocol may be utilized, according to an embodiment. The infrastructure may comprise a platform 112 (e.g., one or more servers, applications, databases, services, networks, and/or resources) which hosts and/or executes one or more of the various processes described herein, for example, as software implementing the various server-side processes. As illustrated, platform 112 is comprised in a cloud 110, such that platform 112 is implemented using on-demand access to a pool of collocated and/or dispersed resources (e.g., servers, applications, databases, services, networks, etc.) that are shared with other entities (e.g., other platforms). Cloud 110 may comprise a public cloud, private cloud, and/or other cloud type, including a hybrid cloud comprising a combination of different clouds and/or cloud types. In an alternative infrastructure without cloud 110 or in addition to cloud 110, platform 112 may comprise one or more dedicated resources (e.g., servers, applications, databases, services, networks, etc.) that are not shared with other entities.

As illustrated, platform 112 is communicatively connected to one or more ultra-tags 130 via one or more networks 120. Network(s) 120 may comprise the Internet, and platform 112 may communicate with ultra-tag(s) 130 through the Internet using standard transmission protocols, such as HyperText Transfer Protocol (HTTP), HTTP Secure (HTTPS), File Transfer Protocol (FTP), FTP Secure (FTPS), Secure Shell (SSH) FTP (SFTP), and/or the like, as well as proprietary protocols. Network(s) 120 may also comprise one or more wireless networks, such as a cellular network that employs the Long Term Evolution (LTE) standard for high-speed wireless communications. While platform 112 is illustrated as being connected to all ultra-tags 130 through a single set of network(s) 120, it should be understood that platform 112 may be connected to different ultra-tags 130 via different sets of network(s).

Platform 112 may comprise a web service which receives requests from ultra-tags(s) 130, and provides responses in eXtensible Markup Language (XML), JavaScript Object Notation (JSON), and/or any other suitable or desired format. In such embodiments, platform 112 may provide an application programming interface (API) which defines the manner in which ultra-tag(s) 130 may interact with the web service. A client application executing on one or more ultra-tag(s) 130 may interact with a server application executing on platform 112 to execute one or more or a portion of one or more of the various processes described herein (e.g., implemented in software). The client application may be "thin," in which case processing is primarily carried out server-side by the server application on platform 112. Alternatively, the client application may be "thick," in which case processing is primarily carried out client-side by ultra-tag(s) 130. It should be understood that the client application on ultra-tag(s) 130 may perform an amount of processing, relative to the server application on platform 112, at any point along this spectrum between "thin" and "thick," depending on the design goals of the particular implementation. However, in a preferred embodiment, to minimize battery consumption at the ultra-tag, an ultra-thin client application or no client application at all is used, such that most, if not all, processing is performed by a server application on platform 112. In such an embodiment, the server application on platform 112 may provide software-as-a-service (SaaS) for the ultra-tags 130.

As illustrated, ultra-tag(s) 130 may implement a set of interconnection layers 132 to facilitate communications between applications executing on ultra-tag(s) 130 and platform 112 over network(s) 120. Although not shown, platform 112 may implement a similar or identical set of interconnection layers 132. In the illustrated embodiment, interconnection layers 132 comprise a physical layer, a protocol layer, and an application layer. However, this illustrated set of layers is merely representative and non-limiting. In an embodiment, interconnection layers 132 may conform or be similar to the Open Systems Interconnection (OSI) reference model, which includes a physical layer, data-link layer, network layer, transport layer, session layer, presentation layer, and application layer, in that order from lowest to highest. In any case, interconnection layers 132 provide functions for providing a flow of data between a physical layer, in which bits are physically conveyed to and from network(s) 120 (e.g., at the electrical, optical, and/or radio level), at the lowest level and an application layer, which receives data, to be communicated, from applications (e.g., executing on ultra-tag(s) 130) and passes communicated data to those applications, at the highest level.

1.2. Example Processing Device

Figure 2:
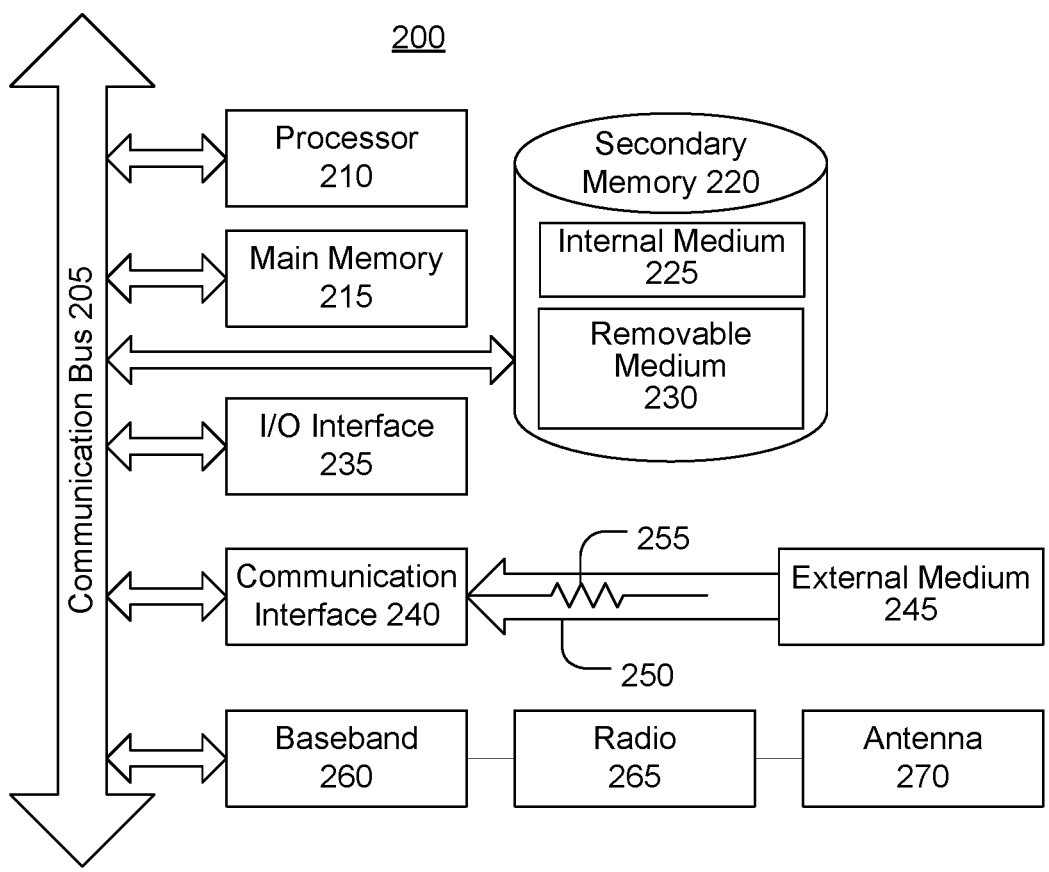
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used in conjunction with one or more of the processes described herein (e.g., to execute software implementing the processes), and may represent components of platform 112, ultra-tag(s) 130, and/or other processing devices described herein. System 200 can be any processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed above. It should be understood that programs stored in the memory and executed by processor 210 may be written and/or compiled according to any suitable language, including without limitation C/C++, Java, JavaScript, Perl, Visual Basic, .NET, and/or the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, etc. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive signal, which is sent from radio system 265 to baseband system 260.

Baseband system 260 decodes the signal. Baseband system 260 also codes the digital signals for transmission and generates a baseband transmit signal that is routed to radio system 265. The radio mixes the baseband transmit signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 and/or 220 may store various software modules.

1.3. Example Ultra-Tag

Figure 3:
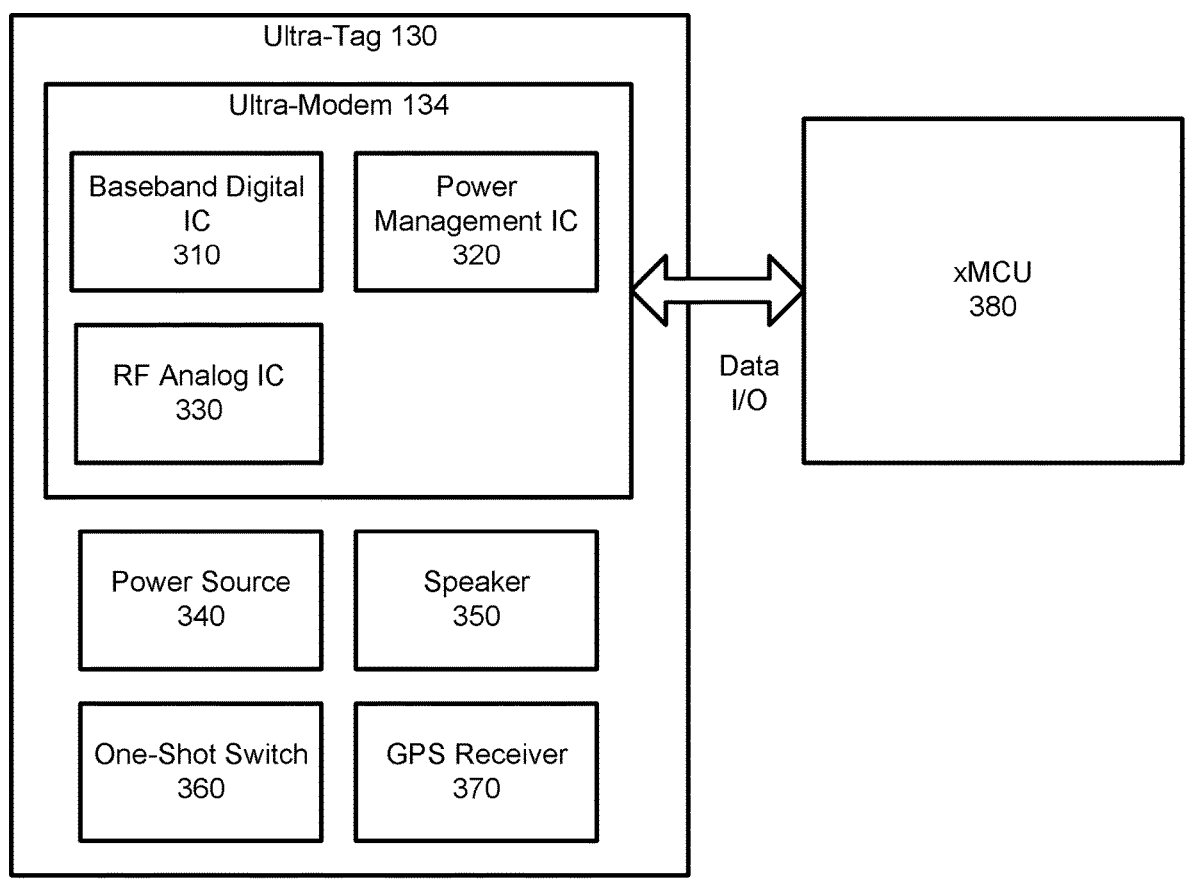
FIG. 3 illustrates an example ultra-tag, according to an embodiment.

FIG. 3 illustrates an example ultra-tag 130, according to an embodiment. Ultra-tag 130 comprises an ultra-modem 134. On the client side, ultra-modem 134 may communicate with one or more external microcontrollers (xMCU) 350, via a wired or wireless connection. In many applications, ultra-modem 134 will be connected to external microcontroller(s) 350 via a wired connection. Ultra-modem 134 may operate to relay information between each external microcontroller 380 and platform 112.

In an embodiment, ultra-tag 130 may also comprise a speaker 350, a one-shot switch 360, and a GPS receiver 370. Speaker 350 may be utilized, for example, to provide audible alerts from ultra-tag 130. One-shot switch 360 may be utilized, for example, to activate or register the ultra-tag 130. GPS receiver 370 may be utilized, for example, to acquire current GPS coordinates for the ultra-tag 130.

Each external microcontroller 380 may comprise a controller that manages one or more sensors or other external devices. Examples of external microcontroller 380 include, without limitation, a smoke detector, a burglar alarm sensing device (e.g., window open or breakage sensor, door open sensor, motion detector, etc.), a moisture sensor (e.g., for lawn or field irrigation, etc.), a temperature sensor (e.g., for medical use, food management, items in transit, etc.), a pressure sensor (e.g., for depth and/or elevation detection, etc.), and/or the like.

For certain applications, an external microcontroller 380 may not be necessary. In such a case, an ultra-modem 134 may not communicate with any external microcontroller 380. For example, an ultra-tag which only reports its location may comprise an on-board Global Positioning System (GPS) receiver 370, and ultra-modem 134 may relay the location of the ultra-tag from GPS receiver 370 to platform 112. Ultra-tags 130 with other onboard sensor(s) or other device(s) are also contemplated. In these cases, ultra-modem 134 may relay data between the onboard device(s) and platform 112.

As illustrated, ultra-tag 130 may comprise or be connected to a power source 340 that provides power to ultra-modem 134, as well as any other components of ultra-tag 130. Power source 340 may comprise a battery (e.g., a D-cell, button cell, rechargeable battery, etc.). Alternatively or additionally, power source 340 may comprise a connection to an "infinite" or significant power source, such as a plug to an electrical grid or a port (e.g., Universal Serial Bus (USB) port) for an electrical connection to a large external battery, such as a car battery or smartphone battery.

In an embodiment, ultra-modem 134 comprises a baseband digital integrated circuit (IC) 310 to manage digital radio functions, a power management IC 320 to manage power requirements of ultra-modem 134, and a radio-frequency (RF) analog IC 330 to manage analog radio functions. Preferably, ultra-modem 134 utilizes cellular technology (e.g., using the LTE standard) to communicate with platform 112, in which case network(s) 120 comprise one or more wireless cellular networks. Advantageously, the use of cellular technology drastically increases the number of applications for which ultra-modem 134 can be used, relative to shorter-range technologies, such as Wi-Fi™, Bluetooth™, and the like. For example, an ultra-tag 130, comprising ultra-modem 134, can be installed in (e.g., embedded within, removably or permanently attached to, etc.) monitored objects, including, without limitation, shoes, vehicles (e.g., car, bicycle, surfboard, train, etc.), locks (e.g., bicycle lock, etc.), child's backpack or clothes, electronic devices (e.g., smartphone, tablet computer, laptop, etc.), pet (e.g., embedded in the pet's collar, embedded in the pet itself, etc.), and virtually any other type of object for which monitoring is desirable. Use of cellular technology, instead of short-range technologies such as Wi-Fi™, allows these objects to be monitored over long distances, and the use of a lightweight protocol may extend the battery life of ultra-tag 130 and ultra-modem 134 to be coextensive or nearly coextensive with the life of the object. The battery life of ultra-tag 130 may also be extended by the techniques disclosed in U.S. patent application Ser. No. 15/321,043, filed on Dec. 21, 2016, which claims priority to International Patent App. No. PCT/US2015/037731, filed on Jun. 25, 2015, which claims priority to U.S. Provisional Patent App. No. 62/017,752, and the techniques disclosed in U.S. Provisional Patent App. No. 62/508,254, filed on May 18, 2017, U.S. Provisional Patent App. No. 62/510,620, filed on May 24, 2017, and U.S. Provisional Patent App. No. 62/511,262, filed on May 25, 2017, all of which are hereby incorporated herein by reference.

Ultra-tag 130 and ultra-modem 134 may comprise fewer, more, or different components than those illustrated in FIG. 3. For example, some embodiments of ultra-tag 130 may omit speaker 350, one-shot switch 360, and/or GPS receiver 370.

2. Process Overview

Embodiments of processes for a lightweight protocol will now be described in detail. The described processes may be embodied in one or more software modules that are executed by one or more hardware processors, for example, as the client and/or server applications discussed above, which may be executed wholly by processor(s) of platform 112, wholly by processor(s) of ultra-tag(s) 130, or may be distributed across platform 112 and ultra-tag(s) 130 such that some portions or modules are executed by platform 112 and other portions or modules are executed by ultra-tags(s) 130. The described processes may be implemented as instructions represented in source code, object code, and/or machine code. These instructions may be executed directly by the hardware processor(s), or alternatively, may be executed by a virtual machine operating between the object code and the hardware processors.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Registration

Figure 4:
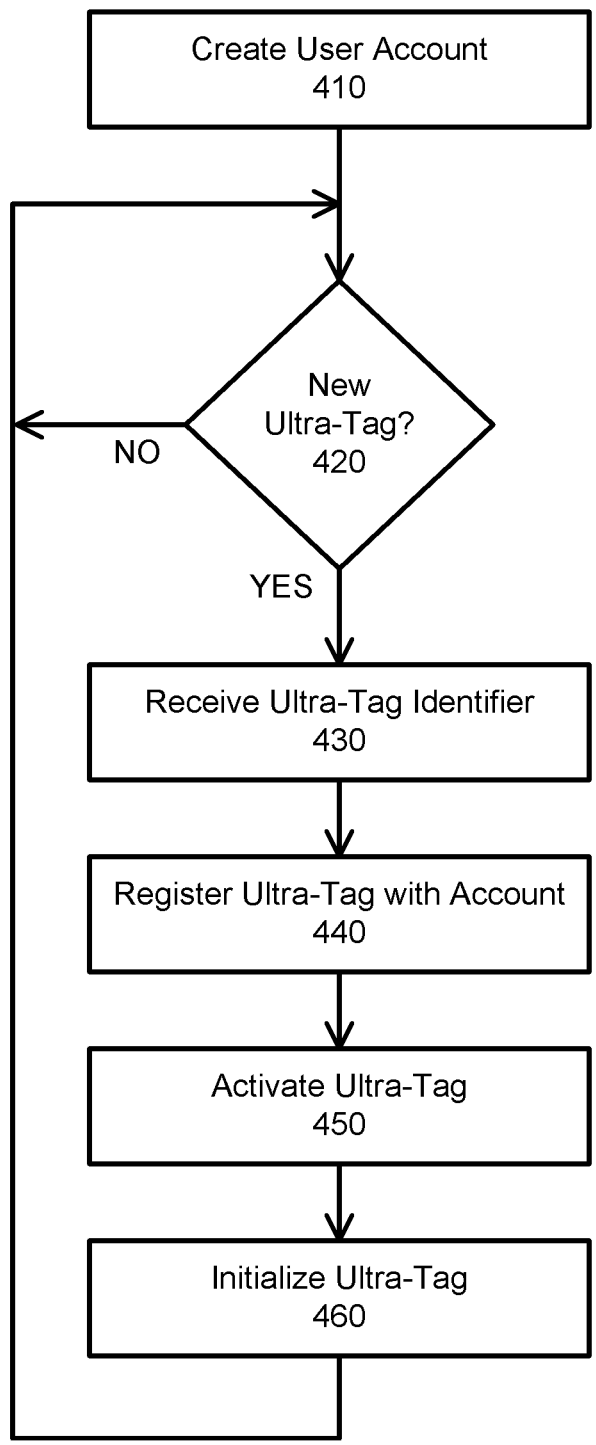
FIG. 4 illustrates a registration process, according to an embodiment.

FIG. 4 illustrates a registration process 400 for ultra-tags 130 that may be implemented by platform 112, according to an embodiment. While registration process 400 is illustrated with a certain arrangement of steps, registration process 400 may be implemented with fewer, more, or different steps and a different arrangement or ordering of steps.

In step 410, a user account is created using an application (e.g., a client and/or server application supported by platform 112). The user account may be created using well-known techniques and user interfaces for account creation. For example, a user may utilize a user interface of the application (e.g., a website or a smartphone app that has been downloaded from an app store) to input account information, including a username (e.g., email address), password, name of the user, contact information, payment information (e.g., credit card or other financial account information, promotional, coupon, or voucher information, etc.), user settings, user preferences, selection of a subscription, and/or the like. This information may be stored and managed by the server application on platform 112, and the user may utilize his or her specified username and password to authenticate with the application in the future.

In steps 420-460, the user registers each of his or her ultra-tag(s) 130. In other words, steps 430-460 are performed for each ultra-tag 130 to be registered to the user's account.

In step 420, if a new ultra-tag 130 is to be registered (i.e., "YES" in step 420), process 400 proceeds to step 430. The user may indicate when a new ultra-tag 130 is to be registered, for example, by logging into the application of platform 112 using the account created in step 410 (e.g., via a website of platform 112 or a mobile app supported by a web service of platform 112), and selecting one or more inputs in a graphical user interface of the application. If no ultra-tag 130 is to be registered (i.e., "NO" in step 420), process 400 waits for the user to indicate when a new ultra-tag 130 is to be registered.

In step 430, the application receives an identifier of the ultra-tag 130 to be registered. For example, the user may utilize a client application on his or her mobile device to scan a Quick Response (QR) code (or other visual code, such as a two-dimensional barcode, serial number, etc.) on the housing of the ultra-tag 130 to be registered. The QR code may encode an identifier (e.g., unique identifier) of the ultra-tag 130. The client application may decode this QR code and transmit the resulting identifier to the server application on platform 112 via network(s) 120, or the client application may transmit the image or other representation of the QR code to the server application on platform 112 via network(s) 120 to be decoded by the server application. As an alternative, the user may input a serial number or other identifier, found on the housing of the ultra-tag 130, into a user interface of the client application on his or her mobile device to be transmitted to the server application on platform 112. In any case, the identifier of the ultra-tag 130 to be registered is received by the server application on platform 112.

In step 440, the identifier of the ultra-tag 130, received in step 430, is registered to the user's account. Specifically, the identifier may be stored, by the server application of platform 112, in association with an identifier of the user or the user's account.

In step 450, the ultra-tag 130 to be registered is activated. In an embodiment which utilizes one-shot switch 360, this may be performed by the user activating (e.g., pressing, in an embodiment in which one-shot switch 360 is a button) one-shot switch 360. Activation of one-shot switch 360 causes the ultra-tag 130 to transmit information (e.g., an initial message), including an identifier of the ultra-tag 130, to platform 112 via ultra-modem 134 and network(s) 120. Platform 112 will receive the identifier of the ultra-tag 130 from ultra-modem 134 and perform a look-up, using the identifier of the ultra-tag 130, to retrieve the identifier of the user's account associated with the identifier of the ultra-tag 130. Platform 112 may use this stored association to initialize or otherwise configure the ultra-tag 130 according to the user's account (e.g., based on a subscription and/or preferences chosen by the user).

In step 460, platform 112 initializes the ultra-tag 130 for the first time. This initialization may comprise updating firmware if necessary, updating GPS satellite information, setting a tag-reporting frequency (e.g., based on a user subscription or preference) which indicates how frequently the ultra-tag 130 will report to platform 112, gathering battery status, and/or managing the ultra-tag's power.

It should be understood that steps 450 and/or 460 could be performed before steps 430 and 440. In the case that step 450 is performed before step 430, platform 112 may receive an identifier from the ultra-tag 130 before that identifier is associated with the user's account. If this occurs, platform 112 may simply ignore the received identifier (which may be periodically transmitted by the ultra-tag 130) until the identifier is associated with a user account in step 440.

2.2. Operation

To achieve a compact design for a battery-powered ultra-tag 130, it is necessary to use a small battery (e.g., as power source 340). Thus, battery life is at a premium. Accordingly, a lightweight protocol is used for minimizing power consumption by ultra-modem 134 of ultra-tag 130.

In an embodiment, ultra-tag 130 transmits a report to platform 112, according to a reporting frequency (e.g., every X minutes). In other words, ultra-tag 130 transmits the report to platform 112 upon the expiration of each reporting interval (e.g., upon the expiration of every X minutes). The reporting frequency may be set by platform 112 at the time of activation (e.g., during initialization in step 460), or changed by platform 112 at any time following activation. For example, the reporting frequency may be changed by platform 112 in response to a change (e.g., by the user) in the settings, subscription, or preferences of the associated user account, or according to a schedule (e.g., at certain times of day, based on the ultra-tag 130 reporting a location outside or inside a geo-fence, etc.). Thus, across different accounts, registered ultra-tags 130 may have different reporting frequencies. Within a single account, each registered ultra-tag 130 may have the same reporting frequency or different reporting frequencies, depending on the scenario and business model. Each time platform 112 receives a report from a registered ultra-tag 130, it processes and stores the reported data for later retrieval.

In an embodiment, the report that is transmitted at each reporting interval comprises: (1) an identifier of the ultra-tag 130 (e.g., an International Mobile Subscriber Identity (IMSI) or other serial number); (2) tag revision number and firmware revision number; (3) time of the report (e.g., a timestamp in case the report is held up for some period, for example, in the cellular network); (4) battery information (e.g., battery status, such as remaining battery life); (5) temperature inside the ultra-tag 130 (e.g., used as part of a battery calculation); and/or (6) GPS satellite data from GPS receiver 370 in ultra-tag 130.

In an embodiment, a user may request the current location of a registered ultra-tag 130, for example, using a graphical user interface of the application supported by platform 112. The request may be one of two types: (1) non-urgent; and (2) urgent. If the user submits a non-urgent request for a registered ultra-tag 130, platform 112 may retrieve and provide the most recently reported data (e.g., GPS coordinates representing the location of the ultra-tag 130 at the time it transmitted its last report) received from that ultra-tag 130. On the other hand, if the user submits an urgent request for a registered ultra-tag 130, platform 112 may immediately transmit a request for a current report to the ultra-tag 130. When the ultra-tag 130 responds with the requested report, platform 112 may provide the reported data to the user (e.g., as GPS coordinates representing the current location of the ultra-tag 130), as well as save the reported data for later retrieval. In other words, if the user submits a non-urgent request, the user may receive stale data (depending on how close to the expiration of a reporting interval the user submits the request), whereas, if the user submits an urgent request, the user will receive current data (assuming the ultra-tag 130 responds).

2.2.1. Short Messages

In an embodiment, the lightweight messaging protocol between platform 112 and ultra-tags 130 utilizes short messages. Each short message may consist of a single packet. In addition, the length of the packet may be embedded in the packet to ensure that recipients of the packet (i.e., platform 112 or ultra-tag 130) are not required to interrogate the whole packet if unnecessary. For example, a length field, that specifies the length of the packet, could be added to the example packet definition described herein.

2.2.2. Inferred ACK/NACK

In an embodiment, the lightweight messaging protocol between platform 112 and ultra-tags 130 utilizes inferred acknowledgements (ACKs) and/or inferred negative acknowledgements (NACKs).

This is in contrast to conventional protocols which utilize explicit ACK responses to acknowledge receipt of a message and NACK responses to indicate a failure in properly receiving the message or some error in the message. For example, a recipient of a message will return an ACK to a sender of the message to acknowledge safe and accurate receipt of the data in the message. Accuracy of the data may be determined using a Cyclic Redundancy Check (CRC) embedded in the packet. The recipient of the message calculates the CRC and compares the calculated CRC to the embedded CRC. If the calculated CRC is identical to the embedded CRC, the data is accurate, and the recipient would return an ACK to the sender to indicate that the data was correctly received. Otherwise, if the calculated CRC does not match the embedded CRC, the recipient would return a NACK to the sender to indicate that the data is likely corrupted and should be retransmitted by the sender. These explicit ACKs and NACKs consume valuable battery capacity, which is not required with the inferred ACKs or NACKs utilized in embodiments of the lightweight protocol described herein.

Specifically, in embodiments, an ultra-tag 130 does not return an ACK or NACK in response to at least a majority (optionally all) of the messages transmitted by platform 112. Instead, platform 112 infers an ACK or NACK based on subsequent action(s) performed by the ultra-tag 130.

For example, platform 112 may transmit a message to an ultra-tag 130 that represents a command to change the reporting frequency of the ultra-tag 130 (e.g., from every hour to every ten minutes). If the ultra-tag 130 correctly receives the command, the ultra-tag 130 will immediately transmit a report to platform 112, followed by subsequent reports upon the expiration of each reporting interval (e.g., until the reporting frequency is changed again or the ultra-tag 130 is deactivated). On the other hand, if the ultra-tag 130 does not correctly receive the command, it will not transmit an immediate report, but will continue transmitting reports at the prior reporting frequency. Thus, platform 112 will infer an ACK if it receives the immediate report from the ultra-tag 130, and will infer a NACK if it does not receive an immediate report from the ultra-tag 130 (e.g., does not receive a report within a timeout period).

If a NACK is inferred, platform 112 may retransmit the message to the ultra-tag 130 representing the command to change the reporting frequency, and may continue retransmitting the message to the ultra-tag 130 until it infers an ACK (e.g., from reception of an immediate report). To reduce power consumption at the ultra-tag 130, the message may be retransmitted with a relatively long gap (e.g., several minutes) between messages. Including a long gap between retransmissions may have at least two effects: (1) allows the ultra-tag 130 time to reliably connect to network(s) 120; and (2) ensures that, if the message is being received by the ultra-tag 130 in a corrupt manner, the ultra-tag 130 will not suffer power drain issues, since it will have time to recover between messages.

2.2.3. Example Packet Definition

Example definitions for packets transmitted from an ultra-tag 130 to platform 112 (also referred to herein as "return" packets) and packets transmitted from platform 112 to an ultra-tag 130 (also referred to herein as "forward" packets) will now be described according to an embodiment. The description includes the defined format and length of each field in a packet. However, these definitions are provided by way of example only, and not limitation. Thus, it should be understood that other definitions of the packets are possible.

In an embodiment, the header in a return message consists of twenty-eight bytes as defined in Table 1 below:

TABLE 1

| Field | Value | Bytes | Position | Description |
|---|---|---|---|---|
| Header in Return Message | | | | |
| Firmware Version | 100-64k | 2 | 0-1 | Increments (e.g., from 1.0.0.0) upon each application of a firmware update (e.g., patch). |
| Chip Version | 100-64k | 2 | 2-3 | Identifies the chip version of the ultra-tag, which may begin with 0. Chip Version can be used to convey the capabilities of the ultra-tag (e.g., chip version 121 may contain GPS and temperature data, whereas chip version 142 may additionally contain radiation level, etc.) |
| Message Type | 0000 | 1 | 4 | The ultra-tag may include 0000 in this field to identify the message as an "initial" message, which is transmitted when the ultra-tag is first activated or after a reset (e.g., "watchdog" reset). The platform may respond with a message containing ephemeris satellite data. The ultra-tag may retransmit the initial message if it does not receive a response from the platform within a timeout period (e.g., 2 minutes). |
| Message Type | 0001 | 1 | 4 | The ultra-tag may include 0001 in this field to identify the message as a "standard" message. |
| Message Type | 0002 | 1 | 4 | The ultra-tag may include 0002 in this field to identify the message as an "unknown GPS" message, which conveys that the ultra-tag is "lost," i.e., cannot see the satellites it knows about. |
| Status | $byte_1$: 0<br>$byte_2$: 0-4 | 2 | 5-6 | $byte_1 = 0$ (Success) indicates success on any standard message.<br>$byte_2$ acknowledges specific events as follows:<br>$byte_2 = 0$ indicates not an ACK of a platform message;<br>$byte_2 = 1$ indicates ACK of firmware update message;<br>$byte_2 = 2$ indicates ACK of ephemeris update message;<br>$byte_2 = 3$ indicates ACK of reporting frequency update message; and<br>$byte_2 = 4$ indicates ACK of Bluetooth ™ configuration message. |

TABLE 1-continued

Header in Return Message

| Field | Value | Bytes | Position | Description |
|---|---|---|---|---|
| Status | $byte_1$: 50<br>$byte_2$: 0-4 | 2 | 5-6 | $byte_1$ = 50 (Failed) indicates failure for any message from the platform.<br>$byte_2$ acknowledges specific events as follows:<br>$byte_2$ = 0 indicates not a NACK of a platform message;<br>$byte_2$ = 1 indicates NACK of firmware update message;<br>$byte_2$ = 2 indicates NACK of ephemeris update message;<br>$byte_2$ = 3 indicates NACK of reporting frequency update message; and<br>$byte_2$ = 4 indicates NACK of Bluetooth ™ configuration message. |
| Status | $byte_1$: 100<br>$byte_2$: 0 | 2 | 5-6 | $byte_1$ = 100 (New) indicates activation of a new ultra-tag and should only be returned when the ultra-tag is first activated (i.e., returned in the "initial" message).<br>$byte_2$ acknowledges specific events as follows:<br>$byte_2$ = 0 indicates not an ACK of a platform message. This is the only possible value since, by definition, the ultra-tag is generating the initial message. |
| Status | $byte_1$: 150<br>$byte_2$: 0 | 2 | 5-6 | $byte_1$ = 150 (Watchdog) indicates that a "watchdog" event on the ultra-tag has reset its embedded firmware and data. This status should be returned with an initial message type (i.e., Message Type = 0000). Watchdog events may include any failure event in the ultra-tag. After such an event, the ultra-tag may reset itself as a means to recover from the failure. Thus, continual watchdog resets may be used to manage bug failures in the ultra-tag instead of a patch or until a patch (e.g., to the firmware of the ultra-tag) can be distributed. |
| Total Messages | 0-64k | 2 | 7-8 | Total number of messages, potentially spread over multiple packets. If this value is zero, then this is the only message in the sequence. |
| Message Number | 0-64k | 2 | 9-10 | Sequence number of this message. This value will always be less than or equal to the value of Total Messages. |
| Correlation ID | 2-byte data | 2 | 11-12 | This is a two-byte random number. The Correlation ID, Total Messages, and Message Number fields, together, determine which messages are part of a set from or to a particular ultra-tag. |
| Timestamp | 4-byte data. | 4 | 13-16 | Time at which the message was transmitted, for example, according to the Coordinated Universal Time (UTC) standard. |
| IMSI | 8-byte data | 8 | 17-24 | This is the unique identifier of the ultra-tag. |
| No. of Minutes | 10-1440 | 2 | 25-26 | Reporting frequency in minutes. The default on an initial message is 1440 (i.e., 24 hours). The minimum in this example is 10 minutes, but could be less (e.g., 5 minutes). |
| CRC | binary data | 2 | 27-28 | CRC value to be used by the recipient to ensure no bits were corrupted during transmission. |

In an embodiment, the body in a return message will depend on the value of the Message Type field in the header of the return message. If the Message Type=0000 (i.e., an initial message), the body may be defined as follows in Table 1.0 below:

TABLE 1.0

Body in Return Message if Message Type = 0000 (Initial)

| Field | Value | Bytes | Position | Description |
|---|---|---|---|---|
| GPS Data | binary data | 32 | 29-60 | For an initial message, the actual location will not be known. Thus, this field may instead include data representing a cell tower location or an approximate location (e.g., requested from the cellular network). This will allow the platform to send appropriate ephemeris information (e.g., in a location message). |
| Internal Temperature | binary data | 1 | 61 | The internal temperature of the battery in the ultra-tag (e.g., in Celsius with a range of −127° C. to 128° C.). |
| Cell ID | binary data | 4 | 141-144 | The identifier of the cell tower on the cellular network (e.g., LTE network) to which the ultra-tag is currently connected. Notably, this is a special field that is only allowed in non-access stratum (NAS) messages (not in standard short message service (SMS) messages) for some LTE networks (e.g., Verizon ™). Messages in the NAS layer allow for longer packet lengths (e.g., 252 bytes) than are typically allowed for SMS messages (e.g., 140 bytes). |
| Token | binary data | 4 | 145-148 | A unique identifier assigned by the platform that is echoed back in any response to the platform. Notably, this is a special field that is only allowed in NAS messages (not in standard SMS). |

If the Message Type=0001 (i.e., a standard message), the body may be defined as follows in Table 1.1 below:

TABLE 1.1

Body in Return Message if Message Type = 0001 (Standard)

| Field | Value | Bytes | Position | Description |
|---|---|---|---|---|
| GPS Data | binary data | 32 | 29-60 | GPS location of the ultra-tag. |
| Internal Temperature | binary data | 1 | 61 | The internal temperature of the battery in the ultra-tag (e.g., in Celsius with a range of −127° C. to 128° C.). |
| Cell ID | binary data | 4 | 141-144 | The identifier of the cell tower on the cellular network (e.g., LTE network) to which the ultra-tag is currently connected. Notably, this is a special field that is only allowed in NAS messages (not in standard SMS). |
| Token | binary data | 4 | 145-148 | A unique identifier assigned by the platform that is echoed back in any response to the platform. Notably, this is a special field that is only allowed in NAS messages (not in standard SMS). |

If the Message Type=0002 (i.e., an unknown GPS message), the body may be defined as follows in Table 1.2 below:

TABLE 1.2

Body in Return Message if Message Type = 0002 (Unknown GPS)

| Field | Value | Bytes | Position | Description |
|---|---|---|---|---|
| GPS Data | binary data | 32 | 29-60 | For an unknown GPS message, the GPS data is not known (e.g., because the ultra-tag cannot sense any GPS satellite). Thus, this field may instead include the identifier of the cell tower on the cellular network (e.g., LTE network) to which the ultra-tag is currently connected. This will allow the platform to send appropriate ephemeris satellite information (e.g., in a location data message). |
| Internal Temperature | binary data | 1 | 61 | The internal temperature of the battery in the ultra-tag (e.g., in Celsius with a range of −127° C. to 128° C.). |
| Token | binary data | 4 | 145-148 | A unique identifier assigned by the platform that is echoed back in any response to the platform. Notably, this is a special field that is only allowed in NAS messages (not in standard SMS). |

In an embodiment, the header in a forward message consists of twenty-five bytes as defined in Table 2 below:

TABLE 2

Header in Forward Message

| Field | Value | Bytes | Position | Description |
|---|---|---|---|---|
| Message Type | 0000 | 1 | 0 | A value of 0000 in this field indicates that the message is an update to the ultra-tag's reporting frequency. |
| Message Type | 0001 | 1 | 0 | A value of 0001 in this field indicates that the message is a firmware update. Notably, there may be multiple packets in a firmware update, which is addressed by the Total Messages and Message Number fields. |
| Message Type | 0002 | 1 | 0 | A value of 0002 in this field indicates that the message comprises ephemeris satellite information. Notably, there may be multiple packets for the ephemeris satellite information, which is addressed by the Total Messages and Message Number fields. |
| Message Type | 0003 | 1 | 0 | A value of 0003 in this field indicates that the message comprises a simple instruction to execute a new version of firmware. |
| Message Type | 0004 | 1 | 0 | A value of 0004 in this field indicates that the message represents a kill command. In an embodiment, an uninterrupted sequence of N (e.g., 3) consecutive kill messages must be received by the ultra-tag before the ultra-tag will implement a kill/shutdown process. Thus, if a message of any other message type is received after the first kill message and before the final (e.g., third) kill message, a kill counter will be reset to zero at the time that the non-kill message is |

TABLE 2-continued

Header in Forward Message

| Field | Value | Bytes | Position | Description |
|---|---|---|---|---|
| | | | | received. Only when the kill counter reaches N, will the ultra-tag shutdown. In an embodiment, this shutdown is irreversible. |
| Message Type | 0005 | 1 | 0 | A value of 0005 in this field indicates that the message comprises an instruction to turn off or turn on and configure Bluetooth ™ capabilities of the ultra-tag. |
| Total Messages | 0-64k | 2 | 1-2 | Total number of messages, potentially spread over multiple packets. If this value is zero, then this is the only message in the sequence. |
| Message Number | 0-64k | 2 | 3-4 | Sequence number of this message. This value will always be less than or equal to the value of Total Messages. |
| Correlation ID | 2-byte data | 2 | 5-6 | This is a two-byte random number. The Correlation ID, Total Messages, and Message Number, together, determine which messages are part of a set from or to a particular ultra-tag. |
| Timestamp | 4-byte data. | 4 | 7-10 | Time at which the message was transmitted, for example, according to the UTC standard. |
| IMSI | 8-byte data | 8 | 11-18 | This is the unique identifier of the ultra-tag. This field does not need to be used if Message Type = 0002 (location message), since that message type will most likely be transmitted to multiple ultra-tags at once. |
| Firmware No. of Bytes | 1-100 | 1 | 19 | This field is only used if the Message Type = 0001 (firmware update), and represents the number of data bytes to expect in this message. |

In an embodiment, the body in a forward message will depend on the value of the Message Type field in the header of the forward message. If the Message Type=0000 (i.e., reporting frequency update message), the body may be defined as follows in Table 2.0 below:

TABLE 2.0

Body in Forward Message if Message
Type = 0000 (Reporting Frequency Update)

| Field | Value | Bytes | Position | Description |
|---|---|---|---|---|
| Reporting Frequency | 0-1440 | 4 | 20-23 | A value of the time interval (e.g., in minutes) between reports from the ultra-tag. This value is specified at the platform and transmitted to the ultra-tag. In this example, the maximum time interval is 1,440 minutes (i.e., 24 hours). A value of zero provides a "get now" functionality, in which the ultra-tag will immediately respond with a standard return message, and will not change its reporting frequency. |
| Token | binary data | 4 | 141-144 | A unique identifier assigned by the platform that is echoed back in any response to the platform. Notably, this is a special field that is only allowed in NAS messages (not in standard SMS). |

If the Message Type=0001 (i.e., firmware update message), the body may be defined as follows in Table 2.1 below:

TABLE 2.1

Body in Forward Message if Message Type = 0001 (Firmware Update)

| Field | Value | Bytes | Position | Description |
|---|---|---|---|---|
| Firmware Data | binary data | 1-121 | 20-140 | This field is of variable length, as the number of bytes and end position of the packet will depend on the value of the Firmware No. of Bytes field in the header. The version of the firmware will be reflected in the Firmware Version field in the header of return messages. |

In an embodiment, if a firmware update at an ultra-tag 130 fails (e.g., due to a corrupted packet of firmware data), the ultra-tag 130 may revert to the prior version of firmware, and the platform 112 may retransmit the firmware update. In an embodiment which does not utilize ACKs, platform 112 will see that the firmware revision number has not changed in the ultra-tag's next reporting message, and may attempt to retransmit the firmware update at that time. In other words, if platform 112 determines that the firmware version number for a particular ultra-tag 130 has not changed to a current firmware version number, after transmitting a firmware update (e.g., after lapse of a predetermined time period from transmitting the firmware update), platform 112 may automatically retransmit the firmware update to that particular ultra-tag 130.

If the Message Type=0002 (i.e., location message), the body may be defined as follows in Table 2.2 below:

TABLE 2.2

Body in Forward Message if Message Type = 0002 (Location)

| Field | Value | Bytes | Position | Description |
|---|---|---|---|---|
| Ephemeris Data | binary data | 1+ | 20+ | This field comprises ephemeris satellite information. In this example, the number of bytes and end position of the packet is not specified, since these values will depend on the particular implementation. |

A location message (i.e., Message Type=0002) is transmitted from platform 112 to an ultra-tag 130 in one or more of the following scenarios: (1) as a regular update (e.g., every two weeks); (2) as a response to an initial message (i.e., a return message with Message Type=0000, e.g., indicating activation or a watchdog reset); and (3) in response to an unknown GPS message (i.e., return message with Message Type=0002, e.g., indicating that the ultra-tag is "lost") assuming a location message has not been transmitted to the ultra-tag within an immediately preceding window of time (e.g., the regular update interval of two weeks).

In an embodiment, if the Message Type=0003 (i.e., firmware execution message) or the Message Type=0004 (i.e., kill message), the body of the message does not contain any data.

If the Message Type=0005 (i.e., Bluetooth™ configuration message), the body may be defined as follows in Table 2.5 below:

TABLE 2.5

Body in Forward Message if Message Type = 0005 (Bluetooth ™ Configuration)

| Field | Value | Bytes | Pos. | Description |
|---|---|---|---|---|
| On/Off | true/false bit | 1 | 20 | A value of 0 (false) will instruct the ultra-tag to turn off its Bluetooth ™ device, whereas a value of 1 (true) will instruct the ultra-tag to turn on its Bluetooth ™ device. |
| ID | binary data | 20 | 21-40 | The identifier which the Bluetooth ™ device will broadcast. Per iBeacon standards, the identifier will be a randomly-generated 128-bit universally-unique identifier (UUID) + 2 bytes for major/minor version. |
| Power Level | range | 1 | 41 | Power level to be used during operation of the Bluetooth ™ device, with a minimum of −18 dBm and a maximum of 18 dBm. |
| Automatic Shut Off Timer | enum | 1 | 42 | Number of minutes before the Bluetooth ™ broadcast should automatically shut off. In an embodiment, valid values are 5, 15, and 30 minutes. |

In an embodiment, the timestamps described herein utilize UTC and comprise a field of four binary bytes. The timestamp is almost identical to the concept of UNIX "time since epoch." UNIX time is defined as the number of seconds since Jan. 1, 1970. The timestamps used in the disclosed system (e.g., by platform 112 and ultra-tags 130) change the definition of "epoch" from Jan. 1, 1970 to Jan. 1, 2015, which is considered Day One of the system. Thus, for example, a timestamp of midnight on Jan. 2, 2015 would be 86400 (60 seconds×60 minutes×24 hours). The timestamp may be stored as a 32-bit (4 byte) number. This modification minimizes the amount of space needed to store timestamps, and mitigates the "year 2038" problem by delaying its occurrence for several decades.

2.3. Kill Command

In an embodiment, platform 112 monitors the remaining battery capacity (e.g., power source 340) of each registered ultra-tag 130 (e.g., via the reports described herein). Via this monitoring, platform 112 can detect when the battery is about to fail. For example, platform 112 may detect when the battery of an ultra-tag 130 has reached its lowest functional capacity (e.g., when the remaining battery drops below a threshold associated with the battery or the ultra-tag 130). The lowest functional capacity represents the minimum remaining battery capacity (or some amount above the minimum) which provides sufficient power to the ultra-tag 130 for the ultra-tag 130 to properly function.

When platform 112 detects that the battery of an ultra-tag 130 is about to fail, platform 112 may transmit a kill command sequence to the ultra-tag 130 via network(s) 120. A kill command sequence comprises a sequence of one or more kill commands. When the ultra-tag 130 receives and executes the kill command sequence, it deactivates itself (e.g., turns off or shuts down).

The kill command sequence may comprise, for example, an uninterrupted sequence of N (e.g., three) kill commands. In an embodiment, if, at any point, the sequence is interrupted (e.g., the ultra-tag 130 receives a command other than a kill command before all N kill commands have been received), the kill command sequence must be restarted. In addition, in an embodiment, once an ultra-tag 130 executes the kill command sequence, it may never be reactivated.

Figure 5:
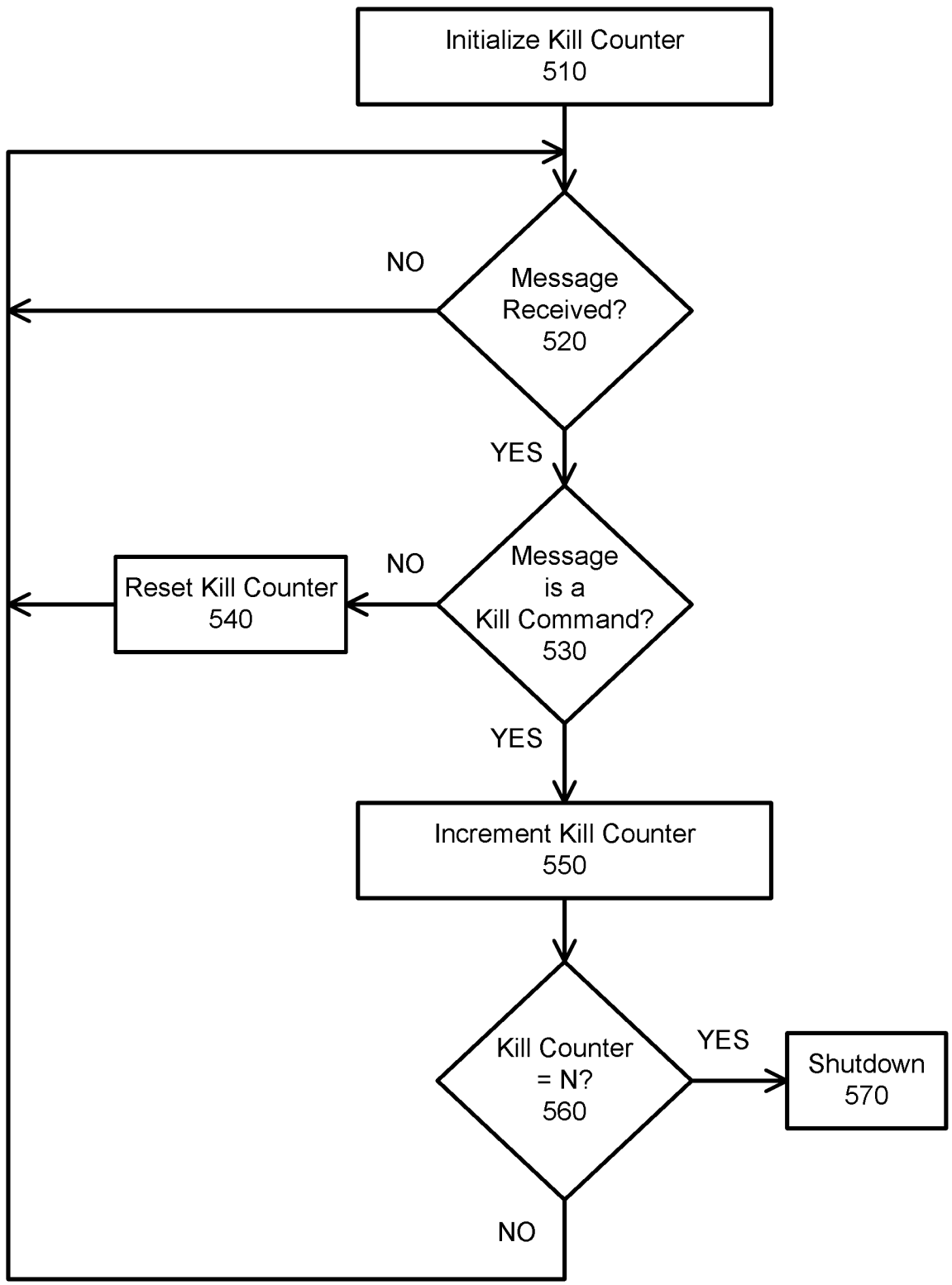
FIG. 5 illustrates a kill process, according to an embodiment.

FIG. 5 illustrates a kill process 500 that may be implemented by ultra-tags 130, according to an embodiment. While kill process 500 is illustrated with a certain arrangement of steps, kill process 500 may be implemented with fewer, more, or different steps and a different arrangement or ordering of steps.

In step 510, a kill counter is initialized (e.g., to zero). While the kill counter will be described as a counter that counts from zero to N, it should be understood that a counter may be implemented in a variety of different ways to achieve the same effect (i.e., to detect N consecutive messages of a particular type).

In step 520, ultra-tag awaits a message from platform 112 via network(s) 120. If no message is received (i.e., "NO" in step 520), process 500 continues to wait for a message. Otherwise, if a message is received (i.e., "YES" in step 520), in step 530, ultra-tag 130 determines whether or not the message, received in step 520, is a kill message. This determination process in step 530 can comprise reading the Message Type field of the forward message to determine whether or not it corresponds to a kill command (e.g., Message Type=0004 in a forward message). If the message is not a kill command (i.e., "NO" in step 530), process 500 resets the kill counter (e.g., to zero) in step 540 and returns to step 520 to wait for another message. Otherwise, if the message is a kill command (i.e., "YES" in step 530), the kill counter is incremented in step 550 (e.g., incremented by one).

In step 560, ultra-tag 130 determines whether or not the value of the kill counter equals a predetermined threshold N. N represents the number of kill commands that must be consecutively received before the ultra-tag shuts down. As an example, N=3. If the value of the kill counter does not equal N (i.e., "NO" in step 560), process 500 returns to step 520 to await another message. Otherwise, if the kill counter does equal N (i.e., "YES" in step 560), the ultra-tag initiates a shutdown process in step 570.

As discussed elsewhere herein, the shutdown process in step 570 may be irreversible. In such an embodiment, the ultra-tag 130 shuts down forever. However, platform 112 may retain all data gathered by the ultra-tag 130 (e.g., reported data, including information relayed from any attached external microcontrollers 350, if any) over the life of the ultra-tag 130. Thus, the user may continue to access the data even after the ultra-tag 130 has been deactivated.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor of a wireless device to:
   in response to a user input at the wireless device, transmit an initial message to a cloud-based platform via a cellular network;
   receive an initial response to the initial message from the cloud-based platform, wherein the initial response specifies an interval;
   in response to the initial response, transmit a reporting message to the cloud-based platform via the cellular network, set a reporting interval to the specified interval, and, upon expiration of each of a plurality of the reporting interval, transmit a new reporting message to the cloud-based platform via the cellular network, wherein each reporting message identifies the wireless device and indicates a status of the wireless device;

subsequently, receive one or more reporting-frequency-update messages from the cloud-based platform, wherein each of the one or more reporting-frequency-update messages specifies a new interval; and, in response to each of the one or more reporting-frequency-update messages, update the reporting interval, at which each new reporting message is transmitted, to the specified new interval, wherein all messages transmitted by the wireless device to the cloud-based platform, including the initial message and all reporting messages, comprise a fixed header that includes a field to acknowledge reception of a message from the cloud-based platform, but wherein no acknowledgement message, which uses the field to acknowledge reception of a message from the cloud-based platform, is ever transmitted to the cloud-based platform in response to any of the one or more reporting-frequency-update messages.

2. The method of claim 1, wherein the status comprises one or more of a location, an internal temperature of a battery in the wireless device, and a remaining capacity of the battery in the wireless device.

3. The method of claim 1, wherein the wireless device comprises a hardware activation button that is dedicated to registering the wireless device with the cloud-based platform, and wherein the user input comprises operation of the activation button.

4. The method of claim 1, further comprising using the at least one hardware processor of the wireless device to:
  initialize a kill counter;
  receive a message from the cloud-based platform via the cellular network;
  determine whether or not the message is a kill command;
  when the message is determined to not be a kill command, reset the kill counter; and,
  when the message is determined to be a kill command, increment the kill counter,
    determine whether or not the kill counter matches a predetermined threshold, and,
    when the kill counter matches the predetermined threshold, initiate shutdown of the wireless device.

5. The method of claim 4, wherein the predetermined threshold is three.

6. The method of claim 4, wherein the shutdown of the wireless device is irreversible.

7. A wireless device comprising:
  a battery;
  a modem configured to wirelessly communicate with a cellular network; and
  at least one hardware processor configured to,
    in response to a user input at the wireless device, transmit an initial message to a cloud-based platform via the cellular network,
    receive an initial response to the initial message from the cloud-based platform, wherein the initial response specifies an interval,
    in response to the initial response, transmit a reporting message to the cloud-based platform via the cellular network, set a reporting interval to the specified interval, and, upon expiration of each of a plurality of the reporting interval, transmit a new reporting message to the cloud-based platform via the cellular network, wherein each reporting message identifies the wireless device and indicates a status of the wireless device,
    subsequently, receive one or more reporting-frequency-update messages from the cloud-based platform, wherein each of the one or more reporting-frequency-update messages specifies a new interval, and,
    in response to each of the one or more reporting-frequency-update messages, update the reporting interval, at which each new reporting message is transmitted, to the specified new interval,
    wherein all messages transmitted by the wireless device to the cloud-based platform, including the initial message and all reporting messages, comprise a fixed header that includes a field to acknowledge reception of a message from the cloud-based platform, but wherein no acknowledgement message, which uses the field to acknowledge reception of a message from the cloud-based platform, is ever transmitted to the cloud-based platform in response to any of the one or more reporting-frequency-update messages.

8. A non-transitory computer-readable medium having instructions stored therein, wherein the instructions, when executed by a processor of a wireless device, cause the processor to:
  in response to a user input at the wireless device, transmit an initial message to a cloud-based platform via a cellular network;
  receive an initial response to the initial message from the cloud-based platform, wherein the initial response specifies an interval;
  in response to the initial response, transmit a reporting message to the cloud-based platform via the cellular network, set a reporting interval to the specified interval, and, upon expiration of each of a plurality of the reporting interval, transmit a new reporting message to the cloud-based platform via the cellular network, wherein each reporting message identifies the wireless device and indicates a status of the wireless device;
  subsequently, receive one or more reporting-frequency-update messages from the cloud-based platform, wherein each of the one or more reporting-frequency-update messages specifies a new interval; and,
  in response to each of the one or more reporting-frequency-update messages, update the reporting interval, at which each new reporting message is transmitted, to the specified new interval,
  wherein all messages transmitted by the wireless device to the cloud-based platform, including the initial message and all reporting messages, comprise a fixed header that includes a field to acknowledge reception of a message from the cloud-based platform, but wherein no acknowledgement message, which uses the field to acknowledge reception of a message from the cloud-based platform, is ever transmitted to the cloud-based platform in response to any of the one or more reporting-frequency-update messages.

* * * * *